United States Patent [19]
Etoh

[11] Patent Number: 4,716,298
[45] Date of Patent: Dec. 29, 1987

[54] SYSTEM FOR AUTOMATICALLY DETECTING PRESENCE OR ABSENCE OF A PRECEDING VEHICLE AND METHOD THEREFOR

[75] Inventor: Yoshiyuki Etoh, Yokosuka, Japan
[73] Assignee: Nissan Motor Company, Limited, Yokohama, Japan
[21] Appl. No.: 739,152
[22] Filed: May 30, 1985
[30] Foreign Application Priority Data Jun. 1, 1984 [JP] Japan ................... 59-110692

[51] Int. Cl.⁴ .............................. G01N 21/86
[52] U.S. Cl. ........................... 250/561; 356/5
[58] Field of Search .......... 356/5; 180/169, 167; 250/561, 221, 222.1

[56] References Cited
U.S. PATENT DOCUMENTS

| 4,552,456 | 11/1985 | Endo | 356/5 |
| 4,621,705 | 11/1986 | Etoh | 180/169 |
| 4,634,272 | 1/1987 | Endo | 356/5 |
| 4,670,845 | 6/1976 | Etoh | 180/169 |

FOREIGN PATENT DOCUMENTS

51-7892 3/1976 Japan .
55-86000 6/1980 Japan .
56-10044 2/1981 Japan .
2139445A 11/1984 United Kingdom .................... 356/5

Primary Examiner—David C. Nelms
Assistant Examiner—Crystal D. Cooper
Attorney, Agent, or Firm—Schwartz, Jeffery, Schwaab, Mack, Blumenthal & Evans

[57] ABSTRACT

A system for detecting the presence or absence of a vehicle in front of a subject vehicle and method therefor, wherein a plurality of wave transmitters transmit distance measuring media such as laser beams or electromagnetic waves over a front detection area toward which the distance measuring media are transmitted in mutually different directions and through respectively predetermined angles with respect to a longitudinal axis of the subject vehicle. In the detecting system and method, the presence of the preceding vehicle is determined on the basis of propagation delay between the times at which at least one of the waves is transmitted and at which the reflected waves are received. The lateral progress of the vehicle in front of the subject vehicle from detection area to detection area is monitored to maintain contact with the detected vehicle even around curves or during steering adjustments.

8 Claims, 14 Drawing Figures

SYSTEM FOR AUTOMATICALLY DETECTING PRESENCE OR ABSENCE OF A PRECEDING VEHICLE AND METHOD THEREFOR

BACKGROUND OF THE INVENTION

1. Field of the Invention

The present invention relates to a system for detecting accurately the presence or absence of a target vehicle in front of and in the same lane as a subject vehicle.

2. Description of the Prior Art

Some recent automotive vehicles are equipped with cruising control systems which hold the vehicle speed at a desired cruising speed. In addition to the above-described cruising control system, systems for controlling vehicle speed so as to track a preceding vehicle, if any, automatically at a safe inter-vehicle distance have been proposed, wherein the opening angle of a throttle valve of the engine is controlled so as to hold the vehicle at essentially the same speed as the preceding vehicle and at a predetermined inter-vehicle distance behind the preceding vehicle. Such a system is discussed in Japanese Patent Application Unexamined Open No. Sho 55-86,000.

It is necessary for a system controlling vehicle speed to measure accurately the inter-vehicle distance to the preceding vehicle in order to appropriately control the vehicle speed. For this reason, a radar unit is installed in the front end of the vehicle to measure the inter-vehicle distance.

Although inter-vehicle distance can be measured accurately by means of a single radar unit using electromagnetic waves such as a high-frequency electraic wave or laser as a measurement medium or a sonar unit using a ultrasonic waves as the medium, the inter-vehicle distance cannot normally be measured on curved roads since a reflected waves will not return to the vehicle. Furthermore, erroneous measurements may result even when reflected waves are captured since such reflected waves may be derived from unrelated vehicles in a neighboring traffic lane.

To ensure measurement while preventing false readings of the inter-vehicle distance when the vehicle is travelling on a curved road, a system for detecting obstacle in front of the vehicle has been proposed. This is exemplified by Japanese Patent Application Examined Open No. Sho 51-7892.

Figure 1:
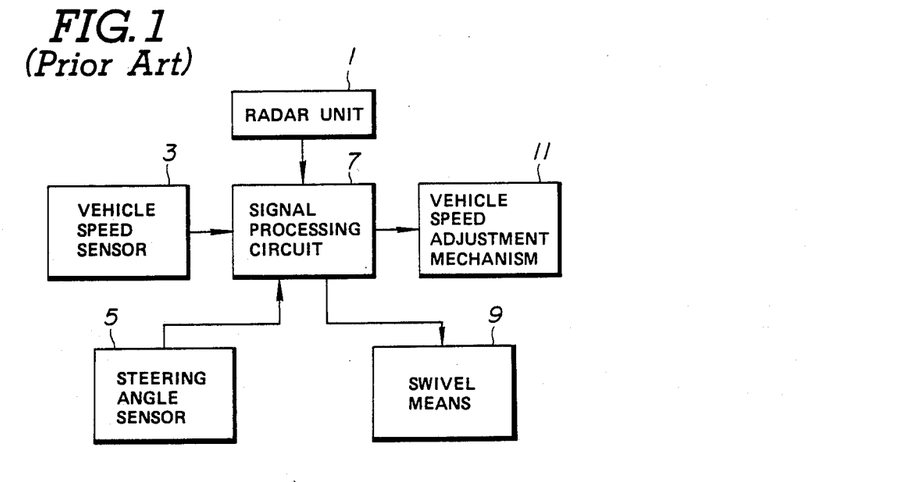
FIG. 1 is a simplified block diagram of a conventional system for detecting the presence or absence of a preceding vehicle.

FIG. 1 shows this conventional system for detecting obstacles in front of the vehicle.

In this system, a swivel unit 9 swivel a radar unit 1 across the width of the vehicle according to the steering angle reported by a steering angle sensor 5 with its equibrium position along the vehicle axis. In other words, in the system shown in FIG. 1, the radar unit 1 pivots according to the angular position of the steering wheel of the vehicle as the vehicle moves along the curved road so that reflected waves can always be captured, thereby ensuring detection of the presence of the preceding vehicle and accurate measurement of the inter-vehicle distance. Therefore, a signal processing circuit 7 controls the vehicle speed via a vehicle speed acceleration/deceleration mechanism 11 in order to maintain a safe inter-vehicle distance on the basis of the results of the above-described distance measurement and of the vehicle speed detected by a vehicle speed sensor 3.

However, in this method for pivotting the radar unit 1 according to the steering angle, the actual steering angle does not always agree with a curvature of the curved road, so that the measurement medium transmitted from the radar unit may not reach the preceding vehicle.

Therefore, the task of determining the presence or absence of the preceding vehicle has not yet been fully resolved.

SUMMARY OF THE INVENTION

With the above-described problem in mind, it is an object of the present invention to provide a system for detecting the presence or absence of a preceding vehicle and method therefor which accurately detects the presence or absence of a preceding vehicle on the same traffic lane as the vehicle.

It is another object of the present invention to provide the system and method therefor which accurately detects the presence or absence of the preceding vehicle on the same traffic lane on curved roads.

This can be achieved by providing a system for detecting the presence or absence of a preceding vehicle in front of a subject vehicle on which the system is mounted, comprises (a) first means for transmitting waves in a plurality of mutually oblique, predetermined directions forward of the vehicle, (b) second means for outputting a first signal upon receipt of waves from any of the transmitting means reflected by an object in front of the vehicle, the first signal indicating the direction of propagation of the reflected wave, for calculating the distance between the subject vehicle and the object on the basis of the propagation delay between transmission of the corresponding wave and reception of the reflected wave and outputting a second signal indicating the calculated distance, and (c) third means for recognizing whether the object is a preceding vehicle moving in front of the subject vehicle on the basis of the first and second signals outputted from the second means.

BRIEF DESCRIPTION OF THE DRAWINGS

A more complete understanding of the present invention may be obtained by the following detailed description taken in conjunction with the drawings in which.

DETAILED DESCRIPTION OF THE PREFERRED EMBODIMENT

Reference will hereinafter be made to the drawings in order to facilitate understanding of the present invention.

Figure 2:
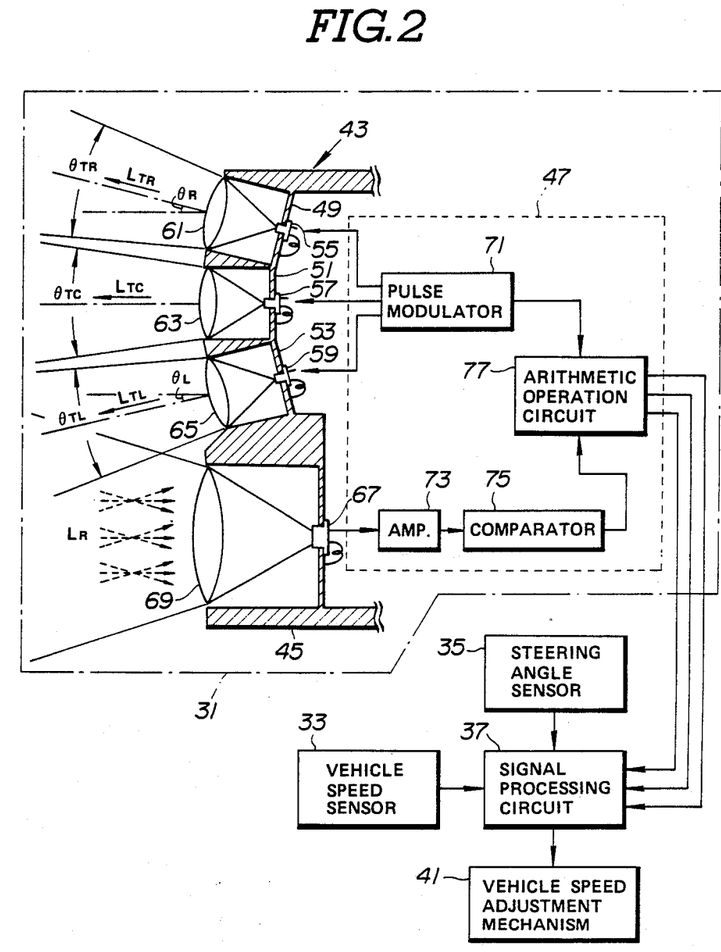
FIG. 2 is a simplified block diagram of the system according to the present invention.
Figure 3A:
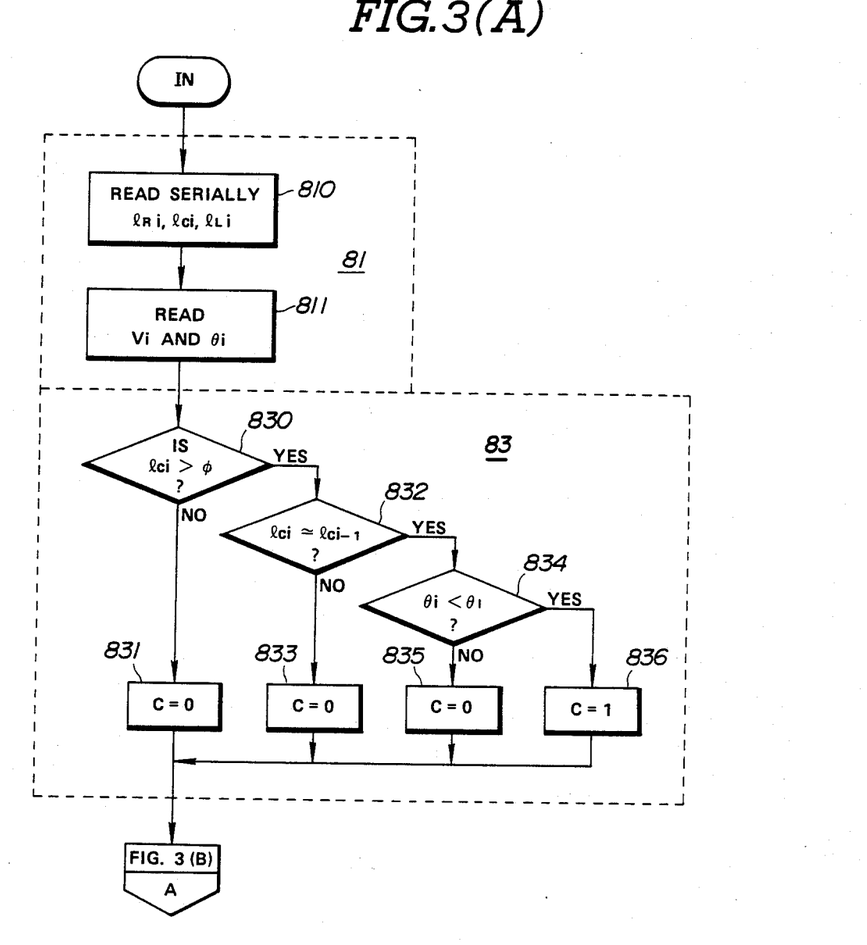
FIGS. 3(A), 3(B), 3(C), 3(D) and 3(E) are integrally a processing flowchart of a signal processing circuit shown in FIG. 2.
Figure 3B:
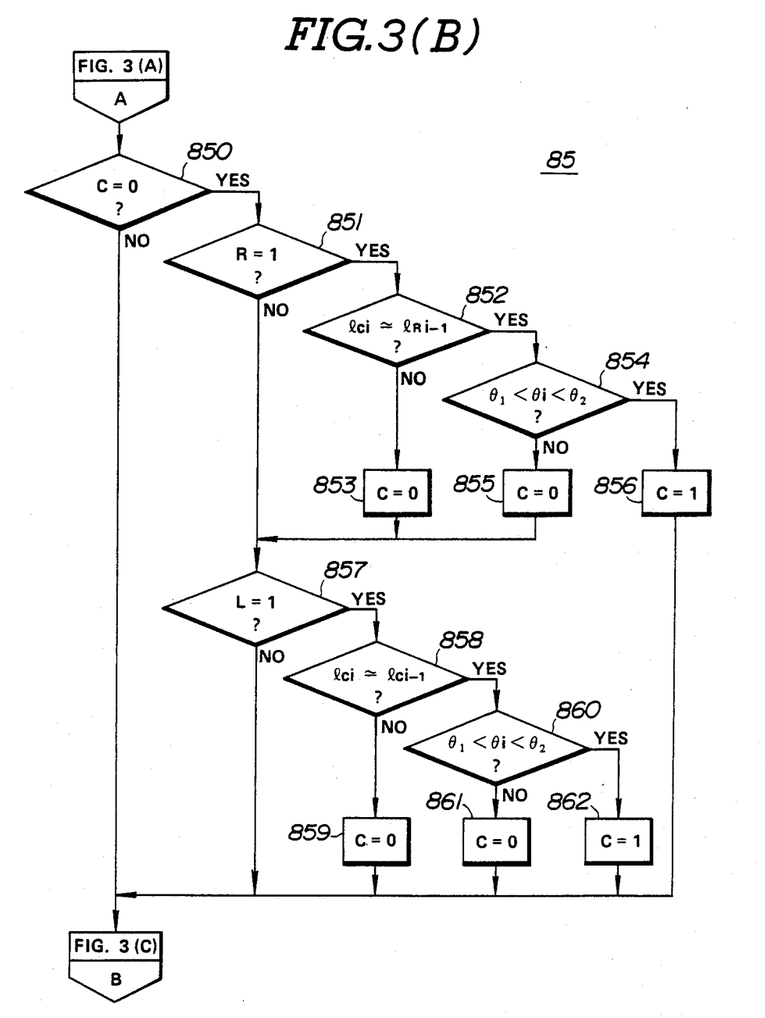
Figure 3C:
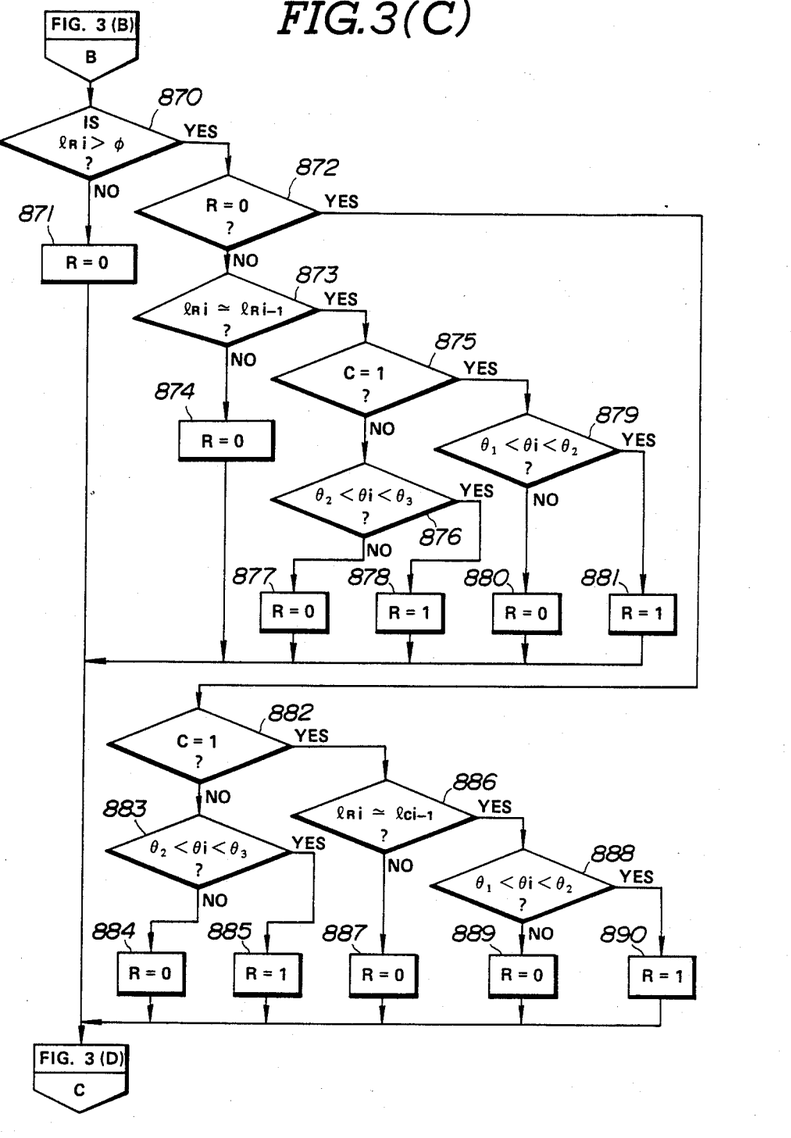
Figure 3D:
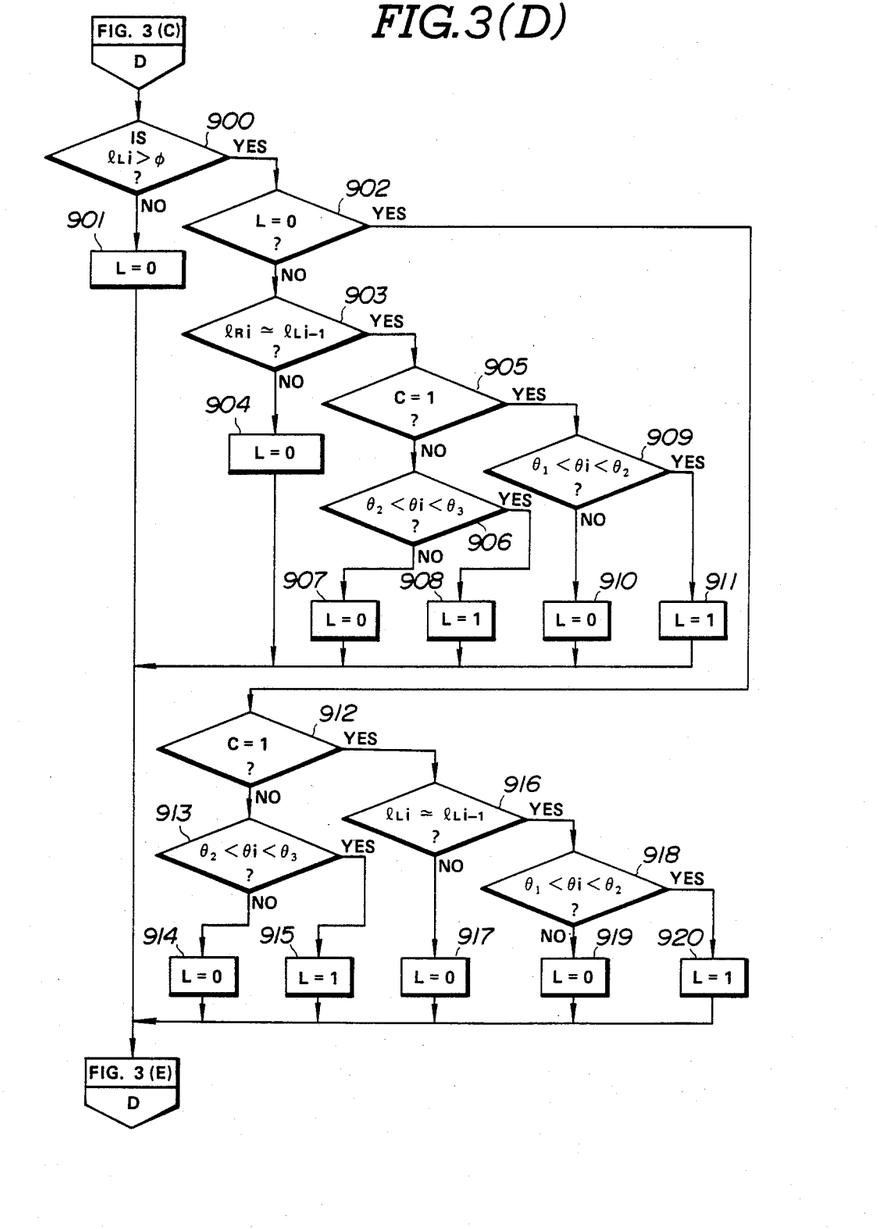
Figure 3E:
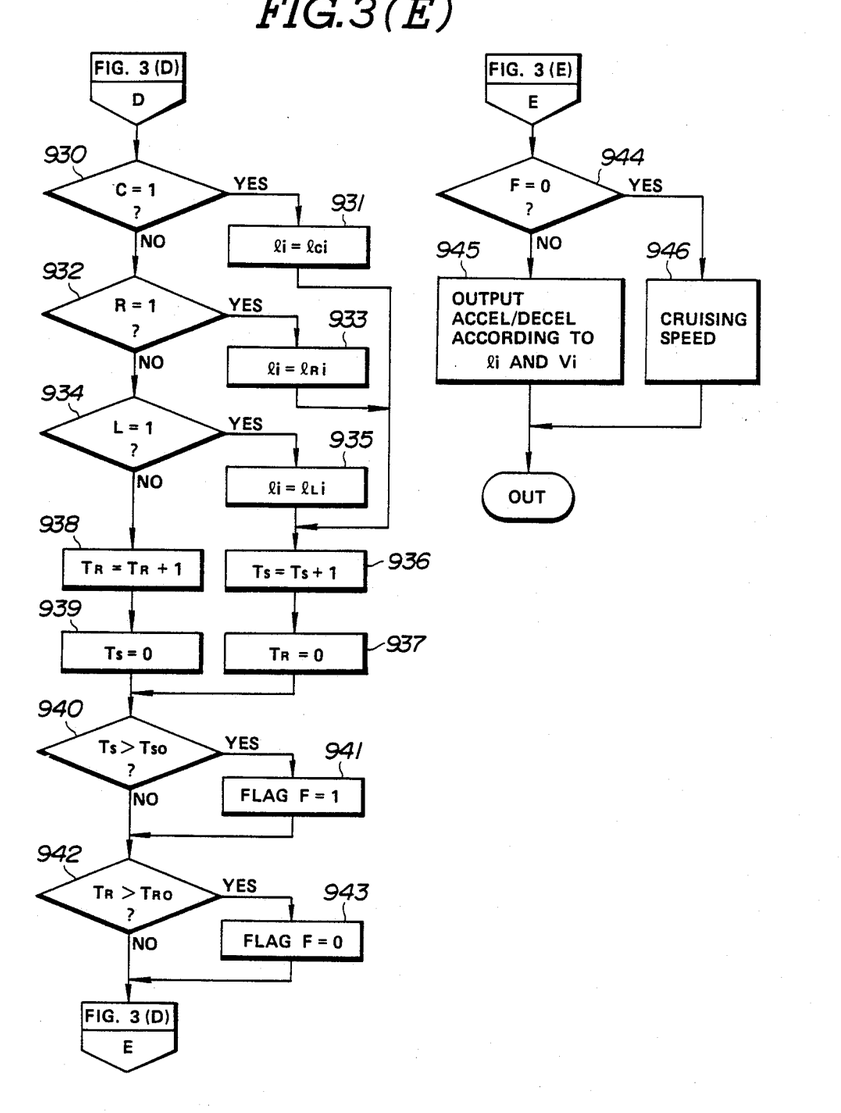

FIG. 2 shows a preferred embodiment of the present invention.

In FIG. 2, a signal processing circuit 37 receives signals from a radar unit 31, a vehicle speed sensor 33, and a steering angle sensor 35, processes these signals, and controls vehicle speed in accordance with the results of this processing via a vehicle speed adjustment mechanism 41.

The structure of the steering angle sensor 35 is exemplified by Japanese Patent Application Examined Open No. Sho. 51-7892 and U.S. Pat. No. 4,342,279, the contents of which are incorporated by reference.

The radar unit 31 is of the optical radar type and includes a light output section 43, a light receiving section 45, and a control section 47. The light output section 43 includes, e.g., three light output units located at the front end of the vehicle, i.e., a first light output unit 51 with its optical axis $L_{TC}$ parallel to the longitudinal axis of the vehicle body; a second light output unit 49 with its optical axis $L_{TR}$ lying oblique to and to the right of the optical axis of the first light output unit 51 by an angle $\theta_R$; and a third light 53 output unit with its optical axis $L_{TL}$ lying oblique to and to the left of the optical axis of the first light output unit 51 by an angle $\theta_L$. It is noted that the left angle $\theta_L$ is equal to the right angle $\theta_R$. It is also noted that each light output unit 49, 51, 53 includes a laser diode 55, 57, 59 and lens 61, 63, 65, respectively so that each light output unit emits a beam of laser light covering a radiation angle of $\theta_{TR}$, $\theta_{TC}$, and $\theta_{TL}$ ($\theta_{TR} = \theta_{TC} = \theta_{TL}$) at intensities of $L_{TR}$, $L_{TC}$, and $L_{TL}$ ($L_{TR} = L_{TC} = L_{TL}$) respectively. Therefore, the vector sum of the laser light is parallel to the longitudinal axis of the vehicle body, i.e. laser light radiates symmetrically with respect to the optical axis of the first laser light output unit 51.

The light receiving section 45 catches laser light reflected transmitted by the light output section 43 and by reflective objects. The light receiving section 45 comprises a light receiving element 67 and a light collecting lens 69 which focuses reflected light onto a photo-sensitive surface of the light receiving element 67.

The control section 47 controls laser transmission and reception so as to ascertain the distance and direction to a target light-reflecting object. The control section 47 includes a pulse modulator 71, an amplifier 73, a comparator 75, and an arithmetic operation unit 77.

The pulse modulator 71 outputs a modulated pulse signal with a pulsewidth of approximately 100 nanoseconds and an oscillation frequency of several killohertz serially to the laser diodes 55, 57, and 59. The pulse modulator 71 outputs a light transmission signal to the arithmetic operation circuit 77 synchronously with the modulated pulse signal. The amplifier 73 amplifies a photo-electrically converted signal representing the intensity of received light on the light receiving element 67. The comparator 75 compares the amplified photo-electrically converted signal with a predetermined value and outputs a reflection signal to the arithmetic operation circuit 77 indicating the presence or absence of a laser reflecting object.

The arithmetic operation circuit 77 derives the distance and direction to the laser reflecting object on the basis of the time lag between the light transmission signal and the reflection signal.

The distance can be calculated from the time lag using the following formula:

$$\text{Distance} \lambda = C \cdot T / 2$$

wherein C denotes the speed of light ($3 \times 10^8$ m/sec) and T denotes the signal time lag described above. The signal processing circuit 37 comprises, e.g., a microcomputer and controls vehicle speed in accordance with a processing routine described below.

FIGS. 3(A) through 3(E) show integrally a processing flowchart by which the signal processing circuit 37 controls vehicle speed.

The processing routine shown in FIGS. 3(A) through 3(E) will roughly be divided into groups 81 through 93.

PROCESSING GROUP 81

The processing group 81 processes various kinds of input data necessary for later processing. It include input processing of the distance value measured along each of the axes $L_{TR}$ $L_{TC}$ $L_{TR}$ of the radar unit 31 (step 810) and of the vehicle speed value $V_i$ and steering angle value $\theta_i$ (step 811). It should be noted that the distance values $\lambda_{Ri}$, $\lambda_{Ci}$ and $\lambda_{Li}$ are sequentially measured with reference to the laser light transmitted by the corresponding light output units 49, 51, 53.

PROCESSING GROUP 83

The processing group 83 determines whether or not the central output unit 51 detects a reflective object and in particular a preceding vehicle on the basis of the reflected laser light. In detail, in a step 830, the signal processing circuit determines whether the center beam has been reflected by a reflective object. In a step 831, the circuit resets a flag C to indicate the absence of a preceding vehicle along a center line of the vehicle body if no reflected light is detected in the step 830.

If reflected light is detected, the routine goes to a step 832 in order to determine the presence or absence of a preceding vehicle. In the step 832, the current distance value $\lambda_{Ci}$ is compared with the previous value $\lambda_{Ci-1}$. If $\lambda_{Ci}$ and $\lambda_{Ci-1}$ differ significantly, the flag C is cleared in a step 833 to indicate that reflected object is not a preceding vehicle but rather a bicycle or other obstacle in front of the vehicle. If $\lambda_{Ci}$ is approximately equal to $\lambda_{Ci-1}$, the routine goes to a step 834 wherein the current steering angle $\theta_i$ is compared to a first predetermined steering angle $\theta_1$ in order to confirm that the reflected object is a preceding vehicle.

Figure 4:
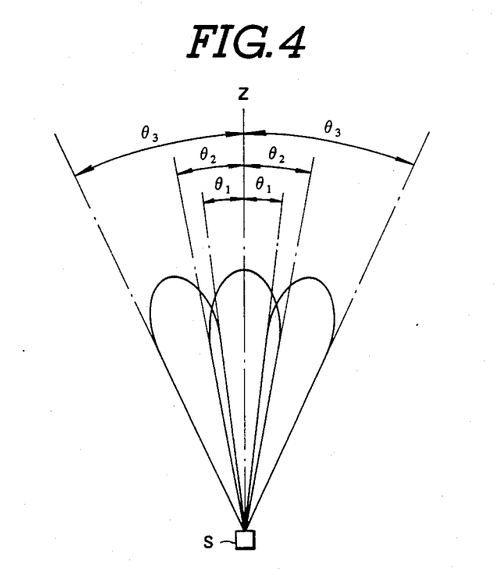
FIG. 4 is a diagram of predetermined steering angles $\theta_1$, $\theta_2$, and $\theta_3$ used in the processing flowchart shown in FIGS. 3(A), 3(B), 3(C), 3(D) and 3(E)

The first predetermined angle $\theta_1$ and second and third predetermined steering angles $\theta_2$ and $\theta_3$ are chosen in consideration of variations in steering technique among individual operators. These angular ranges are shown in FIG. 4. Specifically, the first predetermined steering angle $\theta_1$ is the maximum deviation from the axis of the center beam at which a reflected object will be detected solely by the central beam. The second predetermined steering angle $\theta_2$ is the maximum angular range of the center beam, the edges of which overlap the left- and right-hand beam. The third predetermined angle $\theta_3$ is the angular separation between the axis of the center beam and the outer edges of the left- and right-hand beam.

Returning to FIG. 3, if the current steering angle $\theta_i$ is narrower than the first predetermined angle $\theta_1$ ($\theta_i < \theta_1$) in the step 834, i.e., if the vehicle is moving straight ahead (steering wheel is near its equilibrium position), the flag C is set to 1 in a step 836 to indicate that the detected reflective object is in fact vehicle moving in front of the vehicle and at a comparable speed.

On the ($\theta_i > \theta_1$), the relatively large steering angle $\theta_i$ indicates that the vehicle is most likely moving through a curve. Accordingly the flag C is reset temporarily in step 835 to indicate that the detected preceding vehicle may be in a different lane.

PROCESSING GROUP 85

The processing group 85 clarifies the doubt raised in the step 835, i.e., the reflected object detected by the center beam seems to be a vehicle moving in a different lane.

First, this processing group checks to see if the above-described flag C is reset in a step 850 and determines the states of flags R and L representing detection of a preceding vehicle by the corresponding right- or left-hand beam from the light output unit 49 or 53 in steps 851 and 857. If the flag R is set, the routine goes to a step 852. If the flag L is set, on the other hand, the routine goes to a step 858.

When the routine goes to step 852, the current central distance value $\lambda_{Ci}$ read previously is compared with the previous right distance value $\lambda_{Ri-1}$. This step clears flag C if $\lambda_{Ci}$ and $\lambda_{Ri-1}$ differ significantly since in this case, even if a reflective object were detected by the center beam, the detected object is now recognized as being not a preceding vehicle but rather a bicycle or other obstacle in the same lane as the vehicle. If $\lambda_{Ci}$ is equal or approximate to $\lambda_{Ri-1}$, the routine goes to a step 854 wherein the present steering angle $\theta_i$ is compared to first and second predetermined steering angles $\theta_1$ and $\theta_2$. If $\theta_1 < \theta_i < \theta_2$, i.e. if the detected object lies within the area of overlap of the right and center beams, then it is recognized that the object detected by the center beam is in fact a preceding vehicle and the flag C is set in a step 856.

On the other hand, if the condition $\theta_1 < \theta_i < \theta_2$ is not satisfied in the step 854, flag C is reset. This indicates that the reflective object detected by the center beam at the distance value $\lambda_{Ci}$ in the present processing cycle is in fact the preceding vehicle detected by the right beam at the distance $\lambda_{Ri-1}$ in the previous processing cycle. Therefore, the circuit determines that the reflective object detected by the center beam is a preceding vehicle if flag R is set, $\lambda_{Ci}$ and $\lambda_{Ri-1}$ are comparable and the condition $\theta_1 < \theta_i < \theta_2$ is satisfied in steps 851 through 856.

The concept behind steps 851 through 856 for the right-hand laser unit can be applied equally well to the left-hand laser unit in steps 857 through 862. If the reflective object detected by the center beam is at essentially the same distance $\lambda_{Ci}$ as the previous left-beam distance $\lambda_{Li-1}$, it may be that the preceding vehicle has moved into the area of overlap of the center and left beams. Consequently, the flag C is set in step 862 to indicate that the reflective object detected by the center beam is a preceding vehicle if flag L is set, $\lambda_{Ci}$ and $\lambda_{Li-1}$ are approximately equal, and $\theta_1 < \theta_i < \theta_2$, when checked in steps 857 through 862. Specifically, the circuit compares the current distance value $\lambda_{Ci}$ with the distance $\lambda_{Li-1}$ to the preceding vehicle measured by the left beam in the previous processing cycle. If $\lambda_{Ci}$ and $\lambda_{Li-1}$ differ significantly, flag C is cleared in the step 859 since the reflective object detected by the center beam is not a preceding vehicle but rather some other obstacle. If $\lambda_{Ci}$ is equal or approximate to $\lambda_{Li-1}$, the routine goes to the step 860 wherein the present steering angle $\theta_i$ is compared with the first and second steering angles $\theta_1$ and $\theta_2$.

If $\theta_1 < \theta_i < \theta_2$, flag C is set in the step 862 since the condition $\theta_1 < \theta_i < \theta_2$ indicates that the preceding vehicle detected previously by the left beam is coming into detection range of the center beam. On the other hand, if $\theta_1 < \theta_i < \theta_2$ is not satisfied, flag C is reset in step 861.

PROCESSING GROUP 87

The processing group 87 checks to see whether a preceding vehicle is detected by the right beam. In more detail, the routine checks in step 870 whether or not light reflected by a reflective object is detected. If not, the above-described flag R is reset in a step 871. If an object is detected, the routine goes to a step 872. In the step 872, the state of flag R is checked. If flag R is reset (R=O), i.e., if the reflective object was not detected by the right beam in the previous processing cycle, the routine goes to a step 882. On the other hand, if flag R is set, the routine goes to a step 873.

In the step 873, the circuit compares the current distance value $\lambda_{Ri}$ to the distance value $\lambda_{Ri-1}$ from the previous processing cycle. If $\lambda_{Ri}$ and $\lambda_{Ri-1}$ differ significantly, the detected object is recognized to be an obstacle other than a preceding vehicle such as guard rail extending along the edge of the road, and flag R is cleared to zero in step 874. If $\lambda_{Ri}$ is equal or approximate to $\lambda_{Ri-1}$, the routine goes to a step 875, wherein the state of flag C is checked. If set, the routine goes to a step 879. If reset, the routine goes to a step 876.

In the step 876, the present steering angle $\theta_i$ is compared with the second and third predetermined angles $\theta_2$ and $\theta_3$. If $\theta_2 < \theta_i < \theta_3$, the detected object is recognized to be a preceding vehicle and the flag R is set in a step 878. If $\theta_2 < \theta_i < \theta_3$ is not satisfied, the routine recognizes that the detected object is not a preceding vehicle and resets flag R in a step 877. That is to say, since C=0 and $\lambda_{Ri}$ is equal or approximate to $\lambda_{Ri-1}$ only the right beam has detected the reflective object, and since the object is recognized to be within the area of beam overlap, it cannot be a vehicle or it would have been detected by the center beam. However, if $\theta_2 < \theta_i < \theta_3$, the detected object is assumed to be the preceding vehicle detected in the previous processing cycle.

In the step 879, the steering angle $\theta_i$ is compared to the first and second predetermined angles $\theta_1$ and $\theta_2$, and if $\theta_1 < \theta_i < \theta_2$, the detected object is recognized to be a preceding vehicle and flag R is set in a step 881. If the condition $\theta_1 < \theta_i < \theta_2$ is not satisfied, flag R is reset in a step 880 to indicate that the detected object is not a preceding vehicle.

In the case of step 873, since both flags C and R are set, the preceding vehicle falls within the area of overlap of the center and right beams. In addition, if the previous distance $\lambda_{Ri-1}$ is within a given limit of the currently measured distance $\lambda_{Ri}$ ($\lambda_{Ri}$ is equal or approximate to $\lambda_{Ri-1}$), the preceding vehicle may still be present in the area of overlap, of the center and right beams. This can be ascertained by testing the inequality of $\theta_1 < \theta_i < \theta_2$ in the step 879.

On the other hand, in the step 882, the circuit checks the state of flag C. If set, the routine goes to a step 886. If reset, the routine goes to a step 883.

In the step 883, the circuit compares the present steering angle $\theta_i$ to the second and third predetermined steering angles $\theta_2$ and $\theta_3$. If $\theta_2 < \theta_i < \theta_3$, flag R is set in a step 885 to indicate that the detected object is a preceding vehicle. If $\theta_2 < \theta_i < \theta_3$ is not satisfied, flag R is reset in step 884 to indicate that the detected object is not a preceding vehicle.

In summary, at step 883, since both flags R and C are reset but a reflective object is detected by the right beam currently, it is conceivable that there is a preceding vehicle which has changed from the right lane to the lane in which the vehicle is running. In this case, the preceding vehicle will be present in the detection area of right beam alone for at least one processing cycle. If the condition $\theta_2 < \theta_i < \theta_3$ is satisfied, the presence of a preceding vehicle is confirmed.

On the other hand, in the step 886, the distance value $\lambda_{ci-1}$ measured by the center beam in the previous processing cycle is compared to the distance value $\lambda_{Ri}$ from the present processing cycle. If $\lambda_{Ri}$ is equal or approximate to $\lambda_{ci-1}$, the routine goes to a step 888; otherwise, flag R is reset in step 887. In this case, the reflective object detected by the right beam may be a stationary obstacle, such as a guard rail located along the right edge of the traffic lane rather than the preceding vehicle detected in the previous processing cycle. This consideration can be eliminated if the range of the newly detected object fails to match that of the vehicle detected by the center beam. Otherwise, in the step 888, the steering angle $\theta_i$ is compared to the first and second predetermined steering angles $\theta_1$ and $\theta_2$. If $\theta_1 < \theta_i < \theta_2$, the detected object is a preceding vehicle and flag R is set in a step 890. If the condition $\theta_1 < \theta_i < \theta_2$ is not satisfied, flag R is reset in a step 889. That is, even if the object detected by the right beam is at the same distance as the vehicle detected by the center beam, the detected object cannot be the preceding vehicle if it does not fall within the area of overlap of the two beams. On the other hand, if the detected object falls within the area of overlap, it must be assumed to be the same vehicle detected by the center beam.

PROCESSING GROUP 90

The processing group 90 checks to see whether a preceding vehicle is detected by the left beam. In more detail, the routine checks in step 870 whether or not light reflected by a reflective object is detected. If not, the above-described flag L is reset in a step 871. If an object is detected, the routine goes to a step 872. In the step 872, the state of flag L is checked. If flag L is reset (L=0), i.e., if the reflective object was not detected by the left beam in the previous processing cycle, the routine goes to a step 882. On the other hand, if flag L is set, the routine goes to a step 873.

In the step 873, the circuit compares the current distance value $\lambda_{Li}$ to the distance value $\lambda_{Li-1}$ from the previous processing cycle. If $\lambda$ and $\lambda_{Li-1}$ differ significantly, the detected object is recognized to be an obstacle other than a preceding vehicle such as guard rail extending along the edge of the road, and flag L is cleared to zero in step 874. If $\lambda_{Li}$ is equal or approximate to $\lambda_{Li-1}$, the routine goes to a step 875, wherein the state of flag C is checked. If set, the routine goes to a step 879. If reset, the routine goes to a step 876.

In the step 876, the present steering angle $\theta_i$ is compared with the second and third predetermined angles $\theta_2$ and $\theta_3$. If $\theta_2 < \theta_i < \theta_3$, the detected object is recognized to be a preceding vehicle and the flag L is set in a step 878. If $\theta_2 < \theta_i < \theta_3$ is not satisfied, the routine recognizes that the detected object is not a preceding vehicle and resets flag L in a step 877. That is to say, since C=0 and $\lambda_{Li}$ is equal or approximate to $\lambda_{Li-1}$ only the left beam has detected the reflective object, and since the object is recognized to be within the area of beam overlap, it cannot be a vehicle or it would have been detected by the center beam. However, if $\theta_2 < \theta_i < \theta_3$, the detected object is assumed to be preceding vehicle detected in the previous processing cycle.

In the step 879, the steering angle $\theta_i$ is compared to the first and second predetermined angles $\theta_1$ and $\theta_2$, and if $\theta_1 < \theta_i < \theta_2$, the detected object is recognized to be a preceding vehicle and flag L is set in a step 881. If the condition $\theta_1 < \theta_i < \theta_2$ is not satisfied, flag L is reset in a step 880 to indicate that the detected object is not a preceding vehicle.

In the case of step 873, since both flags C and L are set, the preceding vehicle falls within the area of overlap of the center and left beams. In addition, if the previous distance $\lambda_{Li-1}$ is within a given limit of the currently measured distance $\lambda_{Li}$ ($\lambda_{Li}$ is equal or approximate to $\lambda_{Li-1}$), the preceding vehicle may still be present in the area of overlap of the center and left beams. This can be ascertained by testing the inequality of $\theta_1 < \theta_i < \theta_2$ in the step 879.

On the other hand, in the step 882, the circuit checks the state of flag C. If set, the routine goes to a step 886. If reset, the routine goes to a step 883.

In the step 883, the circuit compares the present steering angle $\theta$ to the second and third predetermined steering angles $\theta_2$ and $\theta_3$. If $\theta_2 < \theta_i < \theta_3$, flag L is set in a step 885 to indicate that the detected object is a preceding vehicle. If $\theta_2 < \theta_i < \theta_3$ is not satisfied, flag L is reset in step 884 to indicate that the detected object is not a preceding vehicle.

In summary, at step 883, since both flags L and C are reset but a reflective object is detected by the left beam currently, it is conceivable that there is a preceding vehicle which has changed from the left lane to the lane in which the vehicle is running. In this case, the preceding vehicle will be present in the detection area of left beam alone for at least one processing cycle. If the condition $\theta_2 < \theta_i < \theta_3$ is satisfied, the presence of a preceding vehicle is confirmed.

On the other hand, in the step 886, the distance value $\lambda_{ci-1}$ measured by the center beam in the previous processing cycle is compared to the distance value $\lambda_{Li}$ from the present processing cycle. If $\lambda_{Li}$ is equal or approximate to $\lambda_{ci-1}$, the routine goes to a step 888; otherwise, flag L is reset in step 887. In this case, the reflective object detected by the left beam may be a stationary obstacle, such as a guard rail located along the left edge of the traffic lane rather than the preceding vehicle detected in the previous processing cycle. This consideration can be eliminated if the range of the newly detected object fails to match that of the vehicle detected by the center beam. Otherwise, in the step 888, the steering angle $\theta_i$ is compared to the first and second predetermined steering angles $\theta_1$ and $\theta_2$. If $\theta_1 < \theta_i < \theta_2$, the detected object is a preceding vehicle and flag L is set in a step 890. If the condition $\theta_1 < \theta_i < \theta_2$ is not satisfied, flag L is reset in a step 889. That is, even if the object detected by the left beam is at the same distance as the vehicle detected by the center beam, the detected object cannot be the preceding vehicle if it does not fall within the area of overlap of the two beams. On the other hand, if the detected object falls within the area of overlap, it must be assumed to be the same vehicle detected by the center beam.

PROCESSING GROUP 93

In the processing group 93, the circuit 77 uses the flags C, R, and L and distance values $\lambda_C$, $\lambda_R$ and $\lambda_L$ to control the vehicle speed either to a constant speed or so as to follow the preceding vehicle at a safe distance. More specifically, if any one of three flags C, R, and L is set, the detected intervehicle distance $\lambda_{ci}$, $\lambda_{Ri}$, or $\lambda_{Li}$ is adopted as an intervehicle distance value $\lambda_i$. In addition, a timer register $T_s$ is incremented to reflect the period of time over which the preceding vehicle is detected and another timer register $T_R$ is reset to indicate the period of time over which no preceding vehicle is detected. This processing is carried out in steps 930 through 937.

On the other hand, if none of the three flags C, R, and L is set, i.e., if no proceding vehicle is detected, the timer register $T_R$ is incremented and timer register $T_s$ is reset in steps 930, 932, 934, 938, and 939. If the current value of timer register $T_s$ exceeds a predetermined limit $T_{so}$ (for example, approximately one second) when checked in step 940, the circuit 77 confirms the presence of a preceding vehicle and a flag F ordering tracking of the preceding vehicle is set to 1 in step 941. Similarly, if the second timer value $T_R$ exceeds a predetermined limit $T_{RO}$ when checked in step 942, the flag F is reset to zero in a step 943. The sequence 940-943 serves to filter high frequency noise out of the detection system, such noise being due to normal, small fluctuations in steering control by the driver or possibly to optical or electronic noise in the system itself.

In the step 944, the state of flag F is checked, and if it is reset, the circuit 77 outputs a command signal in step 945 to a vehicle speed acceleration/deceleration mechanism 41 ordering tracking of the preceding vehicle at a safe intervehicle distance according to the detected intervehicle distance $\lambda_i$ and vehicle speed $v_i$. The command signal is in practice a signal directing the mechanism 41 to accelerate or decelerate the vehicle. The structure of the vehicle speed acceleration/deceleration mechanism 41 is exemplified in Japanese Patent Application Unexamined Open No. Sho. 56-10,044, the contents of which are hereby incorporated by reference. On the other hand, if no preceding vehicle is present (flag F=0), then a cruise-control system (not shown) is ordered to hold the vehicle at a fixed speed in a step 946.

It should be noted that although three light output units are shown in this embodiment, any number of light output units may be used to increase the detection accuracy and reliability for the presence and range of the preceding vehicle.

In addition, the laser-pulse-type radar unit used in this embodiment may be replaced with a visible-light or electromagnetic radar unit, or a sonar unit using ultrasonic vibrations.

Figure 5:
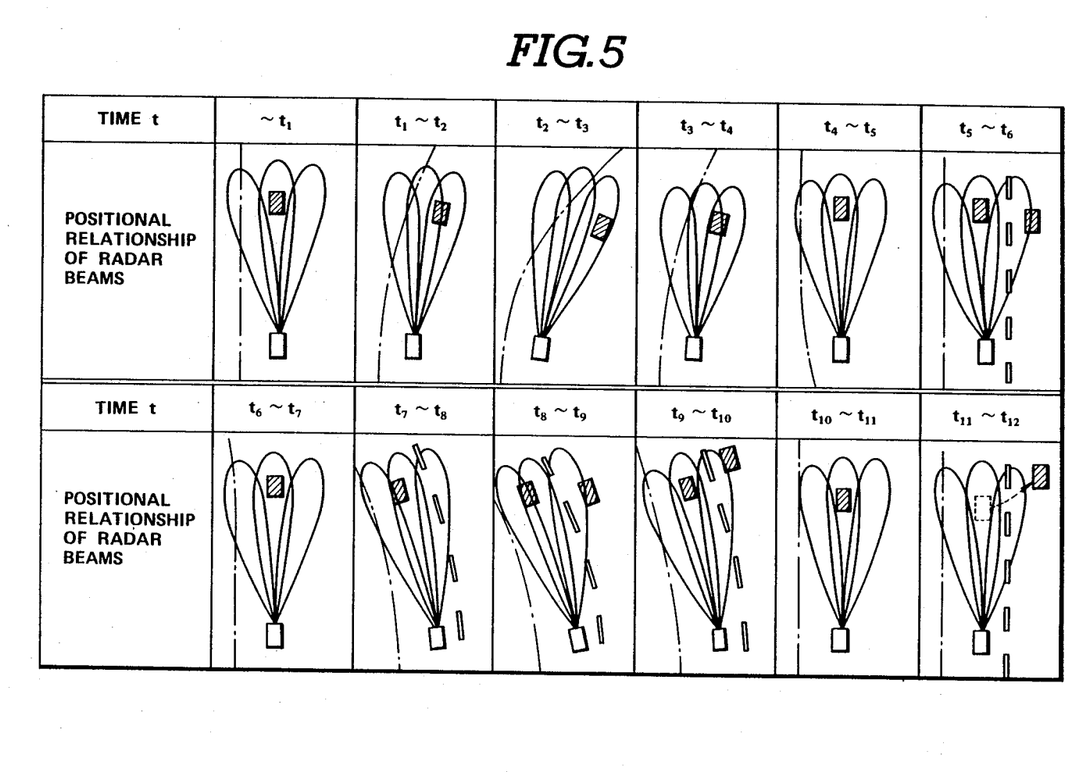
FIG. 5 is a diagram of a specific example of a series of detection episodes as a preceding vehicle moves along a curved road.
Figure 6:
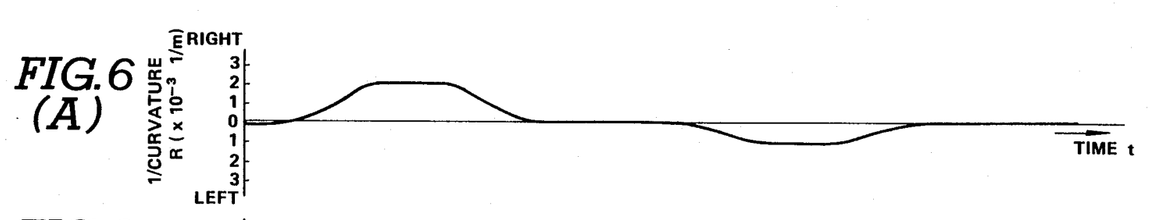
FIGS. 6(A), 6(B), 6(C), 6(D) and 6(E) integrally form a timing chart for the specific example shown in FIG. 5.

The processing flow shown in FIGS. 3(A) through 3(E) will be clarified further with reference to FIG. 5 and FIG. 6.

FIG. 5 shows a time sequence of detection episodes of the preceding vehicle as the vehicles move along a straight stretch, a right curve, a second straight stretch, and finally a left curve. FIGS. 6(A) through 6(E) concern the same series of detection episodes, 6(A) showing the inverse of the radius of curvature of the curves (1/radius of curvature), 6(B) showing the distance value $\lambda_R$ detected by the right beam, 6(C) showing the distance value $\lambda_c$ detected by the left beam, 6(D) showing the distance value $\lambda_L$ detected by the left beam, and 6(E) showing the history of steering adjustment.

<Time t=up to $t_1$>

The preceding vehicle is detected only by the center beam (refer to FIG. 6(B) to 6(D)) along the relatively straight road (refer to FIGS. 6(A) and 6(E)). The processing proceeds through the sequence 830→832→834→836 in which flag C is set in the processing group 83.

<time $t_1$ through $t_2$>

Since the vehicle is entering a right-hand curve (refer to FIGS. 6(A) and 6(E)), the preceding vehicle moves into the region of overlap of the center and right beams (refer to FIGS. 6(B) and 6(C)). The processing proceeds through the sequence of steps 870→872→882→886→888→890 in the above-described processing group 87 in which flag R is set.

<$t_2$ through $t_3$>

As the vehicle moves through the right curve (refer to FIGS. 6(A) and 6(E)), the preceding vehicle can be detected only by the right beam (refer to FIGS. 6(B) through 6(D)). Flag R is set via the processing steps 870→872→873→875→876→878 in the above-described processing group 87.

<$t_3$ through $t_4$>

As the vehicle starts to leave the right curve (refer to FIGS. 6(A) and 6(E)), the preceding vehicle is again detected in the overlapping region of the center and right beams (refer FIGS. 6(B) and 6(C)). After flag C is set in the processing steps 850→851→852→854→856 in the processing group 85, flag R is set in the processing steps 870→872→873→875→879→881 in the processing group 87.

<$t_4$ through $t_5$>

Since the preceding vehicle is again detected only by the center beam on the straight road over the interval of time $t_4$ through $t_5$, flag C is set in the same processing sequence as in the above-described processing before $t_1$.

<$t_5$ through $t_6$>

In this case, a vehicle in the right lane other than the preceding vehicle (e.g., the passing lane) is detected by the right beam while the preceding vehicle is still detected by the center beam as the vehicle moves along an essentially straight road (refer to FIGS. 6(B) and 6(C).

At this time, flag C is set due to the presence of the preceding vehicle in the steps 830→832→834→836. In the processing group 87, due to the presence of the other vehicle, the routine goes through steps 870→872→882→886 and thereafter goes to steps 888 and 889. Therefore, flag R will not be set despite detection of the other vehicle.

<$t_6$ through $t_7$>

Flag C is set via the same processing sequence as in the case before $t_1$ since the preceding vehicle is detected only by the center beam.

<$t_7$ through $t_8$>

As the vehicle enters a left curve (refer to FIGS. 6(A) and 6(E)), the preceding vehicle enters the overlapping region of the center and left beams (refer to FIGS. 6(C) and 6(D)). In the above-described processing group 90, flag L is set after the processing steps 900→902→912→916→918→920. Thereafter, flag L will remain set after execution of the sequence 900→902→903→905→909→911.

<$t_8$ through $t_9$>

During the interval between $t_8$ and $t_9$, the vehicle is moving through a left curve with the preceding vehicle being detected in the overlapping region of the center and left beams. At this time, a vehicle other than the preceding vehicle enters the right lane (for example, the passing lane) (refer to FIGS. 6(B) through 6(D)). The processing follows the sequence 900→902→903→905→909→911. Flag L is set due to the presence of the preceding vehicle. On the other hand, for the other vehicle, the routine follows steps 870→872→882→886 and thereafter goes to step 887 or steps 888 and 889, so that flag R will not be set despite detection of the other vehicle.

<$t_9$ through $t_{10}$>

In this case, the preceding vehicle is detected by the center beam near the end of the left curve (refer to FIGS. 6(C) and 6(D)), while the right beam has detected a vehicle other than the preceding vehicle moving in the right lane (for example, the passing lane) (refer to FIG. 6(B)). In this case, flag C is set due to the presence of the preceding vehicle after the processing sequence 830→832→834→836 in the processing group 83. On the other hand, the routine follows steps 870→872→882→886 in the processing group 87 and thereafter goes to the step 887 or steps 888 and 889 so that flag R will not be set.

<$t_{10}$ through $t_{11}$>

Flag C will be set after the same processing sequence used before $t_1$ since only the center beam detects the preceding vehicle during the interval between $t_{10}$ and $t_{11}$.

<$t_{11}$ through $t_{12}$>

In this case, the preceding vehicle detected only by the center beam changes lanes out of the detection area of the subject vehicle altogether. In this case, since the preceding vehicle has moved out of the detection area of the center beam, through the overlap area and then the detection area of the right beam alone, and finally leaves the detection area of the right beam (refer to FIG. 6(B) and 6(C)), all flags are finally reset and thus the disappearance of the preceding vehicle can be detected.

Therefore, since at least one of flags C, R, and L is set over the time between $t_1$ and $t_{12}$, the system can continuously track the preceding vehicle so that vehicle speed can appropriately be controlled in accordance with the intervehicle distance to the preceding vehicle. As described hereinabove, the system transmits electromagnetic waves or other medium in a plurality of slightly different directions forward of the vehicle to measure the direction and range to a reflective object on the basis of the reflection from the detected object. The radar system follows the preceding vehicle as it moves laterally back and forth across the longitudinal axis of the vehicle, i.e. the axis of the detection system, so that the preceding vehicle can be tracked continuously even through curves. Consequently, the presence of the preceding vehicle in the same lane as the subject vehicle can accurately be determined without interruption.

It will clearly be appreciated by those skilled in the art that the foregoing description is made in terms of the preferred embodiment and various changes and modifications may be made without departing from the scope of the present invention which is to be defined by the appended claims.

What is claimed:

1. A system for detecting the presence or absence of a vehicle present in a detection area of a subject vehicle on which the system is mounted, comprising:
 (a) first means for transmitting measuring media over the detection area toward which the measuring media are simultaneously transmitted in mutually different directions and through respectively predetermined angles with respect to a longitudinal axis of the subject vehicle;
 (b) second means for outputting a first signal upon receipt of any one of the measuring media from the first means reflected by an object which is present in the detection area the subject vehicle, said first signal indicating the direction of propagation of the reflected measuring media toward the object, for calculating a distance between the subject vehicle and the object on the basis of the propagation delay between transmission of the measuring media from the first means and reception of the reflected wave from the object and outputting a second signal indicating the calculated distance between the subject vehicle and the object; and
 (c) third means for recognizing whether the object is a vehicle present in the detection area on the basis of the first and second signals outputted from said second means.

2. The system according to claim 1, wherein said third means recognizes the object as the vehicle present in the detection area if both the distance and direction to the object are within predetermined limits of distance and direction for a vehicle previously present in the detection area.

3. A system for detecting the presence or absence of a vehicle in front of a subject vehicle on which the system is mounted, comprising:
 (a) a plurality of transmitters directed toward a front detection area of the subject vehicle for transmitting measuring media so as to cover a plurality of partially overlapping direction areas forward of the subject vehicle;
 (b) first means for detecting an angular position of a steering wheel of the subject vehicle and outputting a first signal indicative thereof;
 (c) second means for outputting a second signal upon receipt of any measuring media from any of the detection areas reflected by an object present in front of the subject vehicle, said second signal indicating in which detection area or areas the object lies, for calculating a distance between the subject vehicle and the object on the basis of a propagation delay between transmission of the measuring media and reception of the reflected measuring media and for outputting a third signal indicating the calculated distance between the subject vehicle and the object; and
 (d) third means for recognizing whether the detected object is a vehicle in front of the subject vehicle on the basis of the first, second and third signals outputted from said first and second means.

4. The system according to claim 3, wherein said third means recognizes the detected object as the vehicle in front of the subject vehicle if (1) values of the second and third signals for the detected object are within predetermined limits of corresponding values for a vehicle previously in front of the subject vehicle and (2) a present value of the first signal derived from the first means statisfies conditions specified by said second and third signal values.

5. A method for detecting the presence or absence of a vehicle in front of a subject vehicle, comprising the steps of:
 (a) transmitting measuring media over a front detection area toward which the measuring media are simultaneously transmitted in mutually different directions and through respectively predetermined angles with respect to a longitudinal axis of the subject vehicle
 (b) outputting a first signal upon receipt of at least one of the measuring media transmitted in step a) and reflected by an object, said first signal indicating a direction of propagation of the reflected measuring media;

(c) calculating a distance between the subject vehicle and the object on the basis of a propagation delay between transmission of the measuring media and reception of the reflected measuring media;

(d) outputting a second signal indicating the distance calculated in step (c); and (e) determining whether the object is the vehicle in the front detection area on the basis of the first and second signals outputted in steps (b) and (d).

6. The system according to claim 1, wherein the measuring media comprise a plurality of laser beams.

7. The system according to claim 1, wherein said first means is located substantially at a center position of a front surface of the subject vehicle and directed toward the detection area in front of the vehicle.

8. The system according to claim 7, wherein said first means comprises three laser beam transmitters, a first transmitter for transmitting a first laser beam having a predetermined spread angle oriented symmetrically about the longitudinal axis of the subject vehicle, second and third transmitters for transmitting second and third laser beams, each of said second and third laser beams having predetermined spread angles equal to said first laser beam spread angle, said second and third laser beams aligned symmetrically about either side of said first laser beam wherein adjacent spread angles overlap.

* * * * *